United States Patent [19]

Rawlings

[11] Patent Number: 5,477,914
[45] Date of Patent: Dec. 26, 1995

[54] GROUND SOURCE HEAT PUMP SYSTEM COMPRISING MODULAR SUBTERRANEAN HEAT EXCHANGE UNITS WITH MULTIPLE PARALLEL SECONDARY CONDUITS

[75] Inventor: John P. Rawlings, Oklahoma City, Okla.

[73] Assignee: Climate Master, Inc., Oklahoma City, Okla.

[21] Appl. No.: 301,927

[22] Filed: Sep. 7, 1994

Related U.S. Application Data

[60] Division of Ser. No. 158,251, Nov. 29, 1993, Pat. No. 5,372,016, which is a continuation-in-part of Ser. No. 14,940, Feb. 8, 1993, abandoned.

[51] Int. Cl.$^6$ .............................. F24J 3/08; F28D 20/00
[52] U.S. Cl. ................................ 165/45; 165/46; 62/260
[58] Field of Search .............................. 165/45, 46, 173; 62/260

[56] References Cited

U.S. PATENT DOCUMENTS

| | | | |
|---|---|---|---|
| 1,823,661 | 9/1931 | O'Brien | 165/45 X |
| 1,908,733 | 5/1933 | Creel | |
| 1,951,420 | 3/1934 | Jones | 257/239 |
| 2,181,953 | 12/1939 | Usselman | 165/45 |
| 2,461,449 | 2/1949 | Smith et al. | 165/45 |
| 2,513,373 | 7/1950 | Sporn et al. | 165/45 |
| 2,611,584 | 9/1952 | Labus | 257/50 |
| 2,761,286 | 9/1956 | Billue et al. | 165/45 X |
| 3,656,547 | 4/1972 | Beach | 165/106 |
| 4,036,286 | 7/1977 | Anderson et al. | 165/45 |
| 4,036,294 | 7/1977 | Ecker | 165/154 |
| 4,257,239 | 3/1981 | Partin et al. | 62/238.7 |
| 4,286,651 | 9/1981 | Steiger et al. | 165/45 |
| 4,325,228 | 4/1982 | Wolf | 62/260 |
| 4,360,056 | 11/1982 | O'Connell | 165/45 |
| 4,373,573 | 2/1983 | Madwed | 165/2 |
| 4,394,817 | 7/1983 | Remillard | 165/46 |
| 4,407,351 | 10/1983 | Backlund | 165/1 |
| 4,412,126 | 10/1983 | Brockway | 219/553 |
| 4,452,229 | 6/1984 | Powers | 126/429 |
| 4,483,318 | 11/1984 | Margen | 126/400 |
| 4,512,156 | 4/1985 | Nagase | 60/641.2 |
| 4,538,673 | 9/1985 | Partin et al. | 165/45 |
| 4,556,101 | 12/1985 | Haldeman | 165/45 |
| 4,574,875 | 3/1986 | Rawlings et al. | 165/45 |
| 4,657,074 | 4/1987 | Tomita et al. | 165/179 |
| 4,693,300 | 9/1987 | Adachi | 165/1 |
| 4,714,108 | 12/1987 | Barry | 165/45 |
| 4,741,386 | 5/1988 | Rappe | 165/45 |
| 4,753,285 | 6/1988 | Rawlings | 165/45 |

(List continued on next page.)

FOREIGN PATENT DOCUMENTS

| | | | |
|---|---|---|---|
| 0056797 | 1/1982 | European Pat. Off. | |
| 0047223 | 10/1982 | European Pat. Off. | |
| 0207911 | 1/1987 | European Pat. Off. | |
| 2296828 | 12/1974 | France | |
| 318897 | 2/1920 | Germany | 165/45 |
| 2850865 | 11/1978 | Germany | |
| 2928893 | 7/1979 | Germany | |
| 3206577 | 2/1982 | Germany | |
| 3913429 | 5/1988 | Germany | |
| 247948 | 1/1948 | Switzerland | 165/45 |

*Primary Examiner*—Allen J. Flanigan
*Attorney, Agent, or Firm*—McKinney, Stringer & Webster

[57] ABSTRACT

An improved ground source heat pump system wherein the subterranean piping installation comprises modular heat exchange units. Each modular heat exchange unit comprises a plurality of parallel secondary or branch conduits. The use of multiple parallel secondary conduits significantly increases the heat exchange capacity of the system. Because of the increased efficiency of such a system, less piping is required, which in turn reduces the cost of labor and materials to install such a system and the area of land mass required to contain it. Moreover, because the heat exchange units are modular, they can be prefabricated at a remote site and then conveniently transported to construction site and installed much more quickly than the extended lengths of conventional piping.

9 Claims, 3 Drawing Sheets

U.S. PATENT DOCUMENTS

| | | | |
|---|---|---|---|
| 4,821,797 | 4/1989 | Allgäuer et al. | 165/141 |
| 4,880,051 | 11/1989 | Ohashi | 165/45 |
| 4,911,229 | 3/1990 | McElroy | 165/45 |
| 5,054,541 | 10/1991 | Tripp | 165/45 |
| 5,069,199 | 12/1991 | Messner | 126/400 |
| 5,081,848 | 1/1992 | Rawlings et al. | 62/260 |
| 5,103,899 | 4/1992 | Kalina | 165/104.13 |
| 5,244,037 | 9/1993 | Warnbe | 62/260 |
| 5,251,689 | 10/1993 | Habim-Elahi | 165/46 |

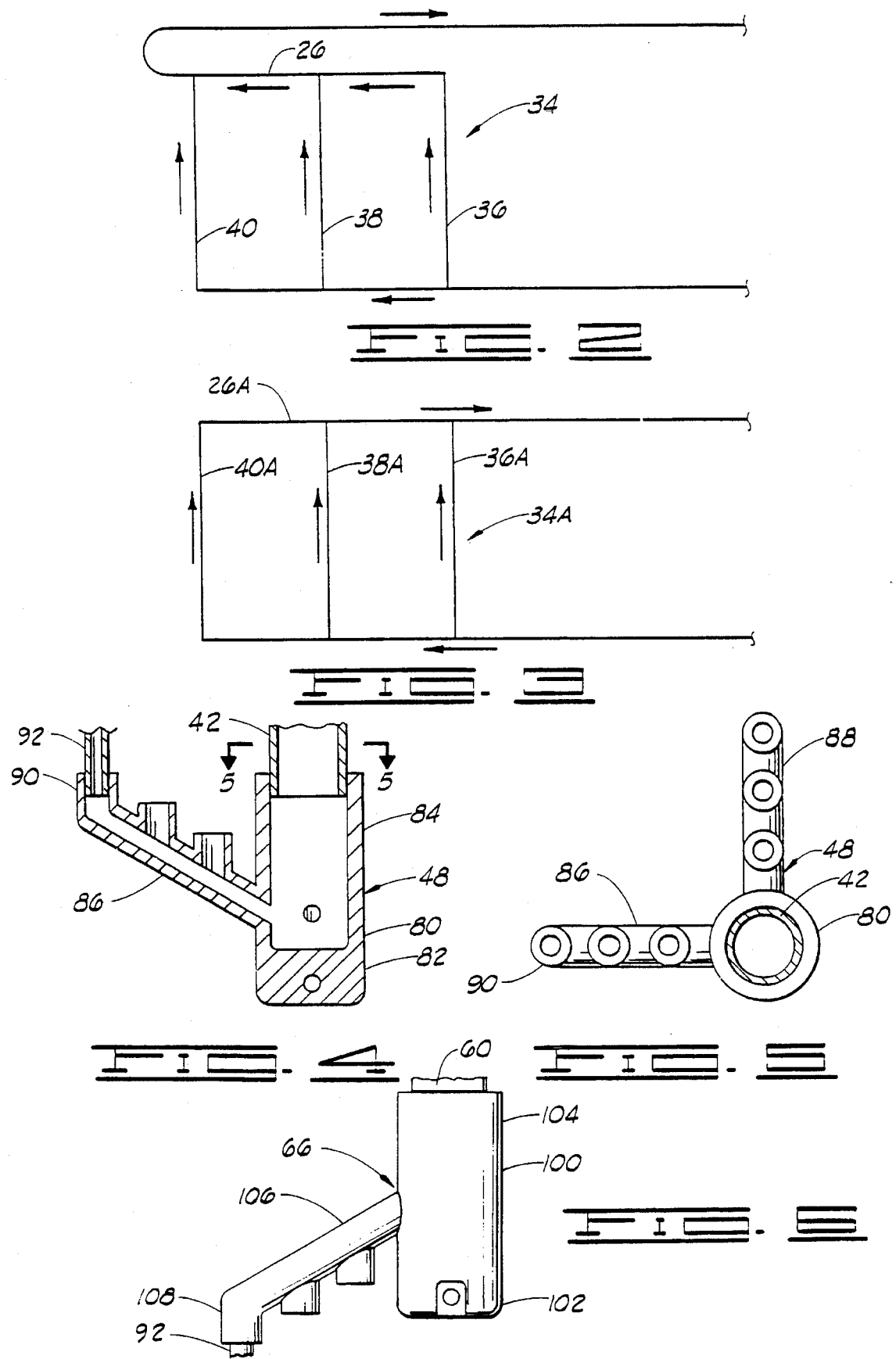

GROUND SOURCE HEAT PUMP SYSTEM COMPRISING MODULAR SUBTERRANEAN HEAT EXCHANGE UNITS WITH MULTIPLE PARALLEL SECONDARY CONDUITS

This application is a division of application Ser. No. 08/158,251, filed Nov. 29, 1993, entitled GROUND SOURCE HEAT PUMP SYSTEM COMPRISING MODULAR SUBTERRANEAN HEAT EXCHANGE UNITS WITH MULTIPLE PARALLEL SECONDARY CONDUITS, now U.S. Pat. No. 5,372,016 which was a continuation in part of application Ser. No. 08/014,940, filed Feb. 8, 1993, entitled GROUND SOURCE HEAT PUMP SYSTEM COMPRISING MODULAR SUBTERRANEAN HEAT EXCHANGE CONDUITS WITH MULTIPLE PARALLEL SECONDARY CONDUITS, now abandoned, and the entire contents of both of these applications are incorporated herein by reference.

FIELD OF THE INVENTION

The present invention relates to ground source heat pump systems.

SUMMARY OF THE INVENTION

The present invention comprises a ground source heat pump system for a structure. The system comprises a heat pump assembly in the structure for adjusting the temperature of a fluid in the structure and a subterranean heat exchanger. A conduit system is included for circulating a heat transfer fluid between the heat pump assembly in the structure and the subterranean heat exchanger. A pump pumps the heat transfer fluid through the conduit system.

The subterranean heat exchanger comprises a supply and return header and at least two modular heat exchange units connected in parallel arrangement between the return and supply header. Each of the modular heat exchange units is characterized as integrally formed of flexible, plastic material. Each such unit comprises a first primary conduit connected to the supply header for receiving heat transfer fluid therefrom. An entry manifold is connected to the first primary conduit for receiving heat exchange fluid therefrom, and a plurality of secondary conduits are connected to the entry manifold for receiving heat transfer fluid directly from the entry manifold.

The secondary conduits are spaced a distance apart from each other, and the common area thereabout is substantially unobstructed. Further, the secondary conduits are substantially unenclosed. In this way, fluid can flow vertically and circumferentially around the secondary conduits.

An exit manifold is connected to the secondary conduits for receiving heat exchange fluid therefrom, and a second primary conduit is connected between the exit manifold and the return header. Thus, the exit manifold receives heat transfer fluid from the secondary conduits and directs the fluid to the return header.

The present invention further comprises a modular subterranean heat exchange unit comprising first and second primary conduits, entry and exit manifolds and a plurality of parallel secondary conduits as in the above described system.

BRIEF DESCRIPTION OF THE DRAWINGS

FIG. 2 is a schematic illustration of the parallel array of heat exchange units in the subterranean heat exchanger of the system shown in FIG. 1 wherein the heat exchange units are arranged for reverse return of the heat transfer fluid.

FIG. 3 is a schematic illustration of an array of parallel heat exchange units designed for direct return of the heat transfer fluid in accordance with another embodiment of the present invention.

FIG. 4 is a longitudinal cross-section of an entry manifold utilized in the present invention for connecting the first primary conduit and the secondary conduits in a subterranean heat exchange unit.

FIG. 5 is a transverse cross-section of the manifold shown in FIG. 4 taken along line 5—5.

FIG. 6 is a side elevational view of an exit manifold which connects the secondary conduits with the second primary conduit.

DETAILED DESCRIPTION OF THE PREFERRED EMBODIMENTS

Figure 1:
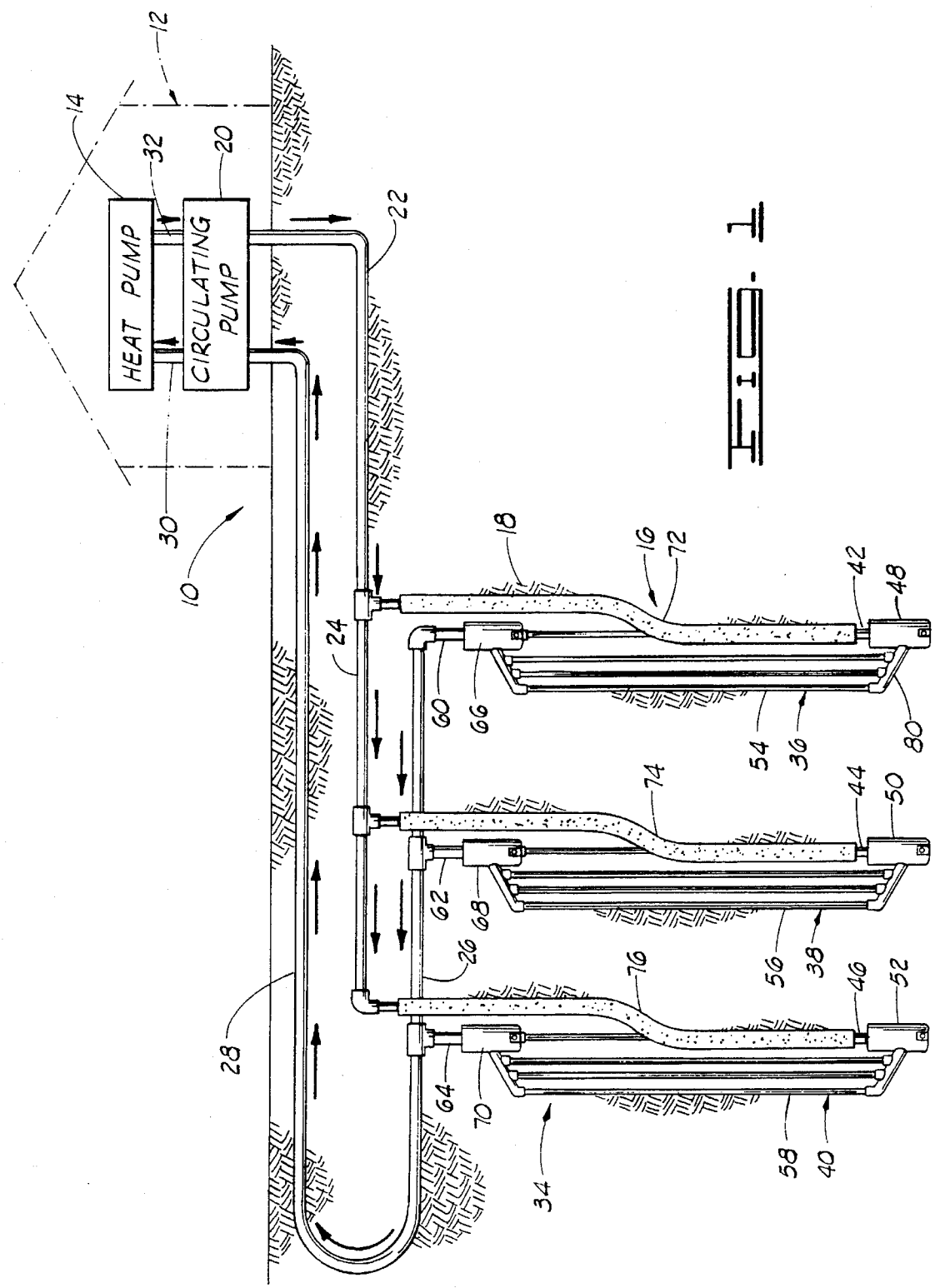
FIG. 1 is a schematic illustration of a ground source heat pump system constructed in accordance with the present invention.

With the decreasing availability of fossil fuels and the rising cost of fuels and electrical power, the need for efficiency in the operation of air conditioning and water heating systems becomes increasingly important. Because they reduce the need for heating or cooling created by external energy, ground source heat pumps are becoming a preferred type of air conditioning system and are also proving efficacious for water heating systems.

A ground source heat pump typically is employed to heat or cool the room air in a structure or to heat water for use in the structure. As used herein, the term "fluid" refers to air or water or to any fluid in the structure to be heated and/or cooled. The heat pump assembly in the structure transfers heat between the fluid in the structure and an underground piping installation. This is accomplished by circulating a heat transfer fluid through a conduit system which connects the heat pump in the structure with a subterranean heat exchanger. The subterranean heat exchanger dumps or sinks heat into, or recovers heat from, the surrounding earth or water in which the heat exchanger is installed.

Ground source or "earth coupled" heat pumps can provide a supply of heat and a reservoir for dumping heat on a year round basis and require substantially less energy for operation. This reduces the cost to the consumer and contributes to energy conservation in general. In extreme climates, a ground source heat pump can be augmented by a fossil fuels or electric heater, if needed. Normally, an efficient ground source heat pump entirely supplants conventional electrical and fossil fuel units. Nevertheless, ground source heat pump systems have disadvantages.

In particular, the piping installations of conventional ground source systems require extensive lengths of pipe to achieve an adequate heat exchange capacity, especially for larger commercial or industrial facilities. The extreme pipe lengths require highly detailed designing to insure proper turbulent flow patterns, flow rate and heat exchange. Further, the extensive lengths of pipe required are costly, and installation is labor-intensive. Finally, a large land mass is necessary to accommodate the lengthy piping installation.

The present invention is directed to an improvement in ground source heat pump systems utilizing modular subterranean heat exchange units in the subterranean piping installation. Each of the modular subterranean units of this invention comprises a primary conduit and multiple parallel secondary conduits, and each unit is integrally formed of flexible, plastic material.

The primary conduit, which receives heat transfer fluid from the conduit system and directs it to the secondary conduits, is insulated to prevent thermal interference between the primary and secondary conduits and to enhance the overall heat transfer performance of the system. The use of multiple secondary conduits substantially increases the surface area of the interface between the heat exchanger unit and the surrounding ground or water and, thus, the overall heat exchange capacity of the system.

Because the subterranean heat exchange units are prefabricated modular units, on-site assembly is eliminated and installation of the system is greatly simplified. In the preferred embodiment, the units are manufactured in a range of standard sizes which provide known heat exchange capacities. This substantially reduces the time conventionally required to design the system generally, and more specifically, to calculate the numbers, lengths and diameters of the underground pipes. Instead, once a desired heat exchange capacity is selected, the possible combinations of standard modular heat exchange units is easily determined.

Due to the use of integrally formed units of flexible plastic, errors in implanting the units can be corrected without disassembling or damaging the units. In addition, the total land mass required to contain the modular conduits with multiple parallel branch conduits is less than that required for conventional underground or subterranean piping installations comprising extended lengths of pipes.

With reference now to the drawings in general and to FIG. 1 in particular, there is shown therein a ground source heat pump system in accordance with the present invention, designated generally by the reference numeral 10. The system 10 is associated with a structure 12 (shown in broken lines). The structure 12 may be a single or multi-family dwelling, commercial building, or any other structure in which there is a need to adjust the temperature of a selected fluid, such as air or water.

The system 10 comprises a ground source heat pump assembly 14 in the structure for adjusting the temperature of a selected fluid. The heat pump assembly 14 is of conventional design and, thus, is not described or shown herein in detail. The heat pump assembly 14 generally includes a first heat exchanger such as an evaporator/condenser unit (not shown). Heat is transferred between the refrigerant in a refrigerant circuit in the evaporator/condenser and the fluid medium which heats or cools the fluid in the structure.

In a water-to-air air conditioning system, a blower (not shown) is included in the assembly 14 for distributing the temperature-conditioned air throughout the interior of the structure 12. In a water-to-water air conditioning system, a suitable fluid distribution system (not shown) is included instead of the blower.

With continuing reference to FIG. 1, the system 10 further comprises an underground or subterranean heat exchanger assembly 16 comprising an array of heat exchange units installed in the earth 18 or in a pond or lake. The heat exchange assembly 16 may be arranged vertically in boreholes or horizontally in trenches or supported in a suitable manner in the body of water. While the configuration and construction of the subterranean heat exchanger assembly 16 may vary, the assembly generally is adapted for permitting the transfer of heat between the heat transfer fluid and the surrounding earth 18 (or water).

Thus, in the cooling mode, heat in the heat transfer fluid is transferred into the cooler earth surrounding the heat exchanger assembly 16. Likewise, in the heating mode, warmth from the surrounding earth is absorbed by the heat transfer fluid. The heat transfer fluid may be water or a water and antifreeze solution.

A pumping unit 20 is provided for circulating the heat transfer fluid between the heat pump assembly 14 and the subterranean heat exchanger assembly 16. A supply line 22 carries the fluid from the pump 20 through a supply header 24 to the assembly 16. The fluid is returned to the pump 20 through a return header 26 and a return line 28. Heat transfer fluid is circulated between the circulating pump 20 and the heat pump assembly 14 by means of supply and return conduits 30 and 32, respectively. The return and supply headers 24 and 26 and much of the return and supply lines 22 and 28 are buried several feet underground in trenches.

Referring still to FIG. 1, the underground heat exchanger assembly 16 comprises a plurality of heat exchange units, designated collectively by the reference numeral 34. It will be understood that the number and configuration of the units 34 may vary widely. For illustration purposes only, the units 34 are depicted in FIG. 1 as including a first heat exchange unit 36, a second heat exchange unit 38 and a third heat exchange unit 40, all arranged in parallel fashion.

Referring now to FIG. 2, the parallel heat exchange units 34 may be arranged in reverse return fashion. In this configuration, also depicted in FIG. 1, the units 34 are arranged so that the first unit 36 connects to the return header 26 upstream of the second unit 38 and the third unit 40 connects to the return header 26 downstream of the second unit 38.

Alternately, the parallel heat exchange units 34A may be configured in direct return fashion, as depicted in the diagram of FIG. 3. In this arrangement, the first unit 36A connects to the return header 26A downstream of the second unit 38A and the third unit 40A connects to the return header 26A upstream of the second unit 38A.

In accordance with the present invention, the supply and return lines 22 and 28, the supply and return headers 24 and 26 and the heat exchange units 34 are constructed of a flexible, plastic material. A preferred material is high density polyethylene or polybutylene pipe, which is inert, noncorrosive and very flexible.

The flexibility of the plastic material of which the components of the heat exchange units are made is an important feature of this invention and provides several advantages. For example, as described herein the modular heat exchange units may be several hundred feet in length, and the flexibility of the material allows these units to be shipped and stored in rolls. Still further, the flexibility simplifies installation of these long units in that the extended lengths of piping can be unrolled and easily manipulated as the tubing is fed into the borehole.

Returning now to FIG. 1, each of the heat exchange units 36, 38 and 40 includes a first primary conduit 42, 44 and 46, respectively, which receives fluid from the supply conduit 24. Entry manifolds 48, 50 and 52 connect the first primary conduits 42, 44 and 46, respectively, to a plurality of parallel secondary conduits 54, 56 and 58, respectively, which receive heat transfer fluid from the first primary conduits.

The secondary conduits 54, 56 and 58 are connected to second primary conduits 60, 62 and 64, respectively, by exit manifolds 66, 68 and 70, respectively. In the preferred embodiment, the first primary conduits 42, 44 and 46 are at least as long as the secondary conduits 54, 56 and 58, and are substantially covered by a layer of closed cell, waterproof insulating material 72, 74 and 76.

Turning now to FIGS. 4 and 5, the preferred configuration for the entry manifold 48 will be described. It will be understood that in the preferred embodiment of the system of this invention all the entry manifolds 48, 50 and 52 will be similarly formed and, therefore, only one will be described in detail. As seen in FIG. 4, the manifold 48 comprises a hollow cylindrical body portion 80 with a closed bottom end 82 and an open upper end 84. The open upper end 84 is adapted to connect to the first primary conduit 42.

A pair of hollow arms 86 and 88 extend outwardly from near the bottom 82 of the body 80. Several ports, only one of which is indicated by the reference numeral 90, are formed in each of the arms 86 and 88. Each of the ports 90 is adapted to connect to the entry end of one of the plurality of secondary conduits 54, such as the conduit 92. In the embodiment shown, there are six secondary conduits. However, it will be appreciated that the number of secondary conduits may be varied.

An exit manifold 66 is shown in FIG. 6. Again, as all the exit manifolds 66, 68 and 70 are similarly formed, only one will be described in detail herein. The exit manifold 66 comprises a hollow body 100 with a closed bottom 102 and an open upper end 104 adapted to connect to the second primary conduit 60. A pair of arms 106 (only one is shown in the side view of FIG. 6) extend outwardly and downwardly from near the top 104. Ports such as the port 108 extend downwardly from the arm 106 and are adapted for connecting to the exit ends of the secondary conduits 54, such as the secondary conduit 92.

With reference now to FIGS. 7–10, there is shown therein a second embodiment for the subterranean heat exchange unit of the present invention. In this embodiment, designated generally by the reference numeral 36A, the first primary conduit 42A extends through an upper end cap 120 which serves as an exit manifold and terminates in a lower end cap 122 which serves as an entry manifold. The body of the first primary conduit 42A between the upper and lower end caps 120 and 122 is covered by a layer of insulation 72A.

Figure 10:
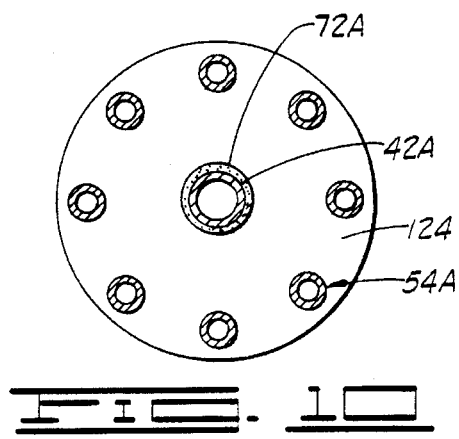
FIG. 10 is a transverse sectional view through the subterranean heat exchange unit shown in FIG. 7 taken along line 10—10.

Secondary conduits 54A extend up from the lower end cap 122 and terminate in the upper end cap 120. In the embodiment shown, there are eight secondary conduits which are arranged circumferentially around the first primary conduit 42A and near the periphery of the end caps 120 and 122, as is best seen in FIG. 10. Thus, heat transfer fluid is conducted from the supply header 24 through the upper end cap down through the insulated first primary conduit 42A and is there directed into the secondary conduits 54A in the lower end cap 122. A second primary conduit 60A connects the upper end cap 120 with the return header 26.

Figure 7:
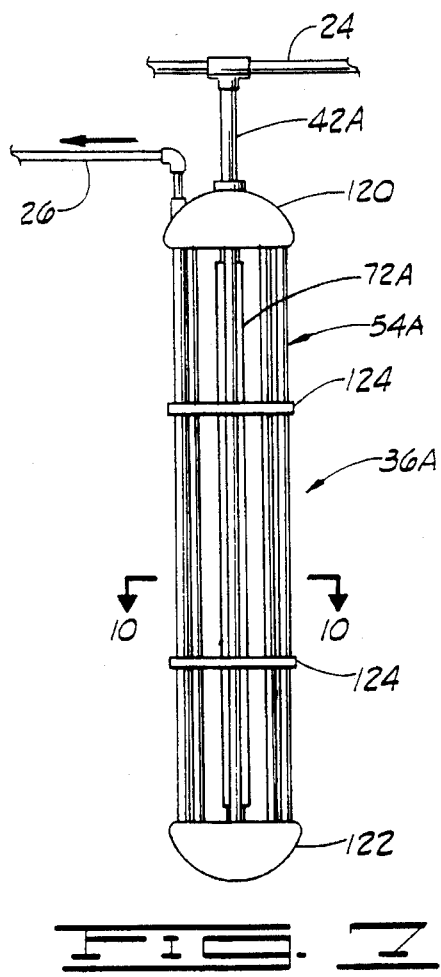
FIG. 7 is a side elevational view of another embodiment of a modular subterranean heat exchange unit in accordance with the present invention.
Figure 8:
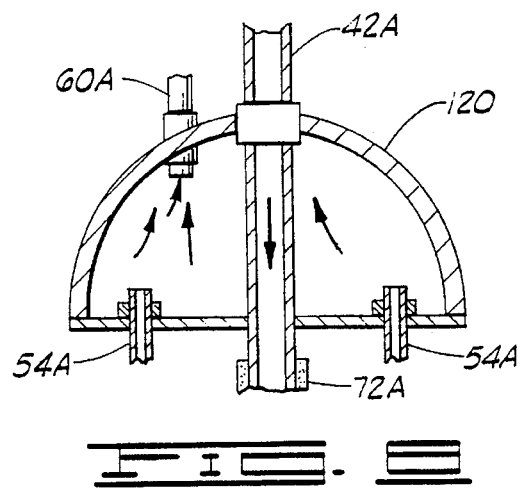
FIG. 8 is an enlarged, fragmented longitudinal view through the upper end cap of the subterranean heat exchange unit shown in FIG. 7.
Figure 9:
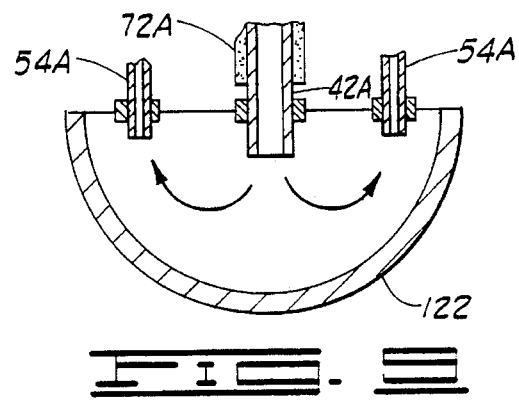
FIG. 9 is an enlarged, fragmented longitudinal view through the lower end cap of the subterranean heat exchange unit shown in FIG. 7.

Referring to FIGS. 7 and 10, one or more spacers 124 are included for stabilizing the positions of the secondary conduits 54A around the first primary conduit 42A. While the spacers may take many forms, a simple plate that fits slidably over the various conduits is sufficient. However, to permit fluid flow vertically around the secondary conduits 54A, the spacers 124 should be no wider than the end caps (manifolds) 120 and 122.

Regardless of the number or configuration of the secondary conduits, it is a feature of this invention that the secondary conduits receive heat exchange fluid in parallel fashion from the first primary conduit and all feed back into the second primary conduit. Consequently, in most applications, the diameter of the secondary conduits will be smaller than the diameter of the primary conduits. Thus, each of the underground heat exchange units of this invention provide a relatively large surface area for interfacing with the surrounding earth (or water). As a result, the heat transfer capability of the entire underground heat exchanger assembly is enhanced.

In the preferred practice of this invention, each heat exchange unit comprising the underground heat exchanger assembly is integrally formed. To this end, the manifolds (or end caps) are heat fused to the conduits. This produces, in effect, a solid unitary structure.

The installation of the underground heat exchanger assembly and accompanying return and supply headers and return and supply lines, are installed in the earth or in ground water. In a preferred earth installation method, a vertical borehole is drilled into the earth for each modular heat exchange unit. Then the unit is dropped into the borehole and connected to the return and supply headers. The borehole typically is "back filled" with a heat conductive filler, such as soil, bentonite or water, for example. Now it will be understood that one advantageous feature of the modular heat exchange units is that the secondary conduits, where most of heat exchange occurs, are unenclosed. This permits one step back filling of the borehole.

Still further, the secondary conduits of each heat exchange unit are spaced a distance apart from each other, but the common area surrounding the secondary conduits is substantially unobstructed. In this way, fluid flow around the secondary conduits is practically unobstructed in all directions. Again, this permits easy back filling in the case of earth installations, and where the units are supported in ground water, good circulation of surrounding water is enhanced.

The lengths and internal diameters of the first and second primary conduits and the secondary conduits are selected to produce a desired flow pattern and flow rate, which further enhances the heat exchange capacity of the system. In most instances, all the heat exchange units in a particular system will be the same length and will be similarly formed.

Although dimensions will vary depending on the particular installation, the return and supply headers typically will be at least 10 feet in length and will have an internal diameter of at least 1.25–2.00 inches. The dimensions of the return and supply lines will depend primarily on the location of the underground installation relative to the structure it will serve.

Preferably, the fluid capacity of the units 34 is less than the capacity of the headers 24 and 26. Most underground heat exchanger assemblies 16 will comprise 2 to 10 modular heat exchange units 34. A standard heat exchange unit may have 2 to 8 secondary conduits. The dimensions of the primary and secondary conduits will vary. As described, the underground heat exchange units may be manufactured in a variety of standard sizes and configurations. For example, one preferred standard unit will comprise secondary conduits which are about 50 feet or more in length with an internal diameter of at least 0.25–0.50 inch. The first primary conduits of this unit would be of limited length, sufficient to connect the supply header and the secondary conduits, with an internal diameter of about 0.85 to about 1.10 inches.

Other standard unit sizes may include, for example, units comprising secondary conduits which have lengths of 75, 100, 200 and 400 feet.

Now it will be understood that, once standard sizes and configurations for underground units are selected, the heat exchange capacity of each size unit can be calculated and provided to the system designer. The designer then, based on these given figures, can simply select a suitable size and number of units. These can be delivered to the construction site and attached without further assembly to the headers.

Now it will be appreciated that the system of the present invention utilizing modular heat exchange units comprising multiple parallel secondary or branch conduits has many advantages. Heat exchange capacity and efficiency are increased. Further, the design, fabrication and installation of such systems are simplified and associated costs are significantly reduced.

Changes may be made in the combination and arrangement of the various parts, elements, steps and procedures described herein without departing from the spirit and scope of the invention as defined in the following claims.

What is claimed is:

1. A modular subterranean heat exchange unit adapted for connection between the supply and return headers of a conduit system which connects a subterranean heat exchanger with a ground source heat pump in a structure:

a first primary conduit adapted to be connected to the supply header for receiving heat transfer fluid therefrom;

an entry manifold connected to the first primary conduit for receiving heat exchange fluid therefrom;

a plurality of secondary conduits each connected to the entry manifold for receiving heat transfer fluid directly from the entry manifold, wherein the secondary conduits are spaced a distance apart from each other, the common area thereabout being substantially unobstructed, and wherein the secondary conduits are substantially unenclosed, whereby fluid can flow vertically and circumferentially around the secondary conduits;

an exit manifold connected to the secondary conduits for receiving heat exchange fluid therefrom; and a second primary conduit connected to the exit manifold and adapted to connect to the return header so that the second primary conduit can receive heat transfer fluid from the secondary conduits and direct the fluid to the return header; and wherein the heat exchange unit is formed of a plastic material which is sufficiently flexible to permit the unit to be rolled or folded up prior to installation.

2. The modular heat exchange unit of claim 1 wherein the first primary conduit is insulated.

3. The modular heat exchange unit of claim 1 comprising from two to about six secondary conduits.

4. The modular heat exchange unit of claim 1 further comprising at least one spacer for stabilizing the positions of the secondary conduits.

5. The modular heat exchange unit of claim 1 wherein the secondary conduits are arranged linearly in at least one row.

6. The modular heat exchange unit of claim 1 wherein the secondary conduits are arranged circumferentially around the first primary conduit.

7. The modular heat exchange unit of claim 1 wherein the secondary conduits in the subterranean heat exchange units are smaller in diameter than the primary conduits.

8. The modular heat exchange unit of claim 1 wherein the unit is integrally formed.

9. The modular heat exchange unit of claim 8 wherein the entry manifold is heat fused to the first primary conduit and the plurality of secondary conduits and the exit manifold is heat fused to the plurality of secondary conduits and the second primary conduit.

* * * * *